No. 702,625. Patented June 17, 1902.
D. A. CHAPPELL.
BOX CAR LOADER.
(Application filed Mar. 8, 1901.)
(No Model.) 10 Sheets—Sheet 1.

Witnesses:

Inventor:
Delos A. Chappell,
By Thomas F. Sheridan,
Atty

No. 702,625. Patented June 17, 1902.
D. A. CHAPPELL.
BOX CAR LOADER.
(Application filed Mar. 8, 1901.)
(No Model.) 10 Sheets—Sheet 2.

Witnesses:
Inventor:
Delos A. Chappell,
By Thomas F. Sheridan,
Atty.

No. 702,625. Patented June 17, 1902.
D. A. CHAPPELL.
BOX CAR LOADER.
(Application filed Mar. 8, 1901.)
(No Model.) 10 Sheets—Sheet 3.
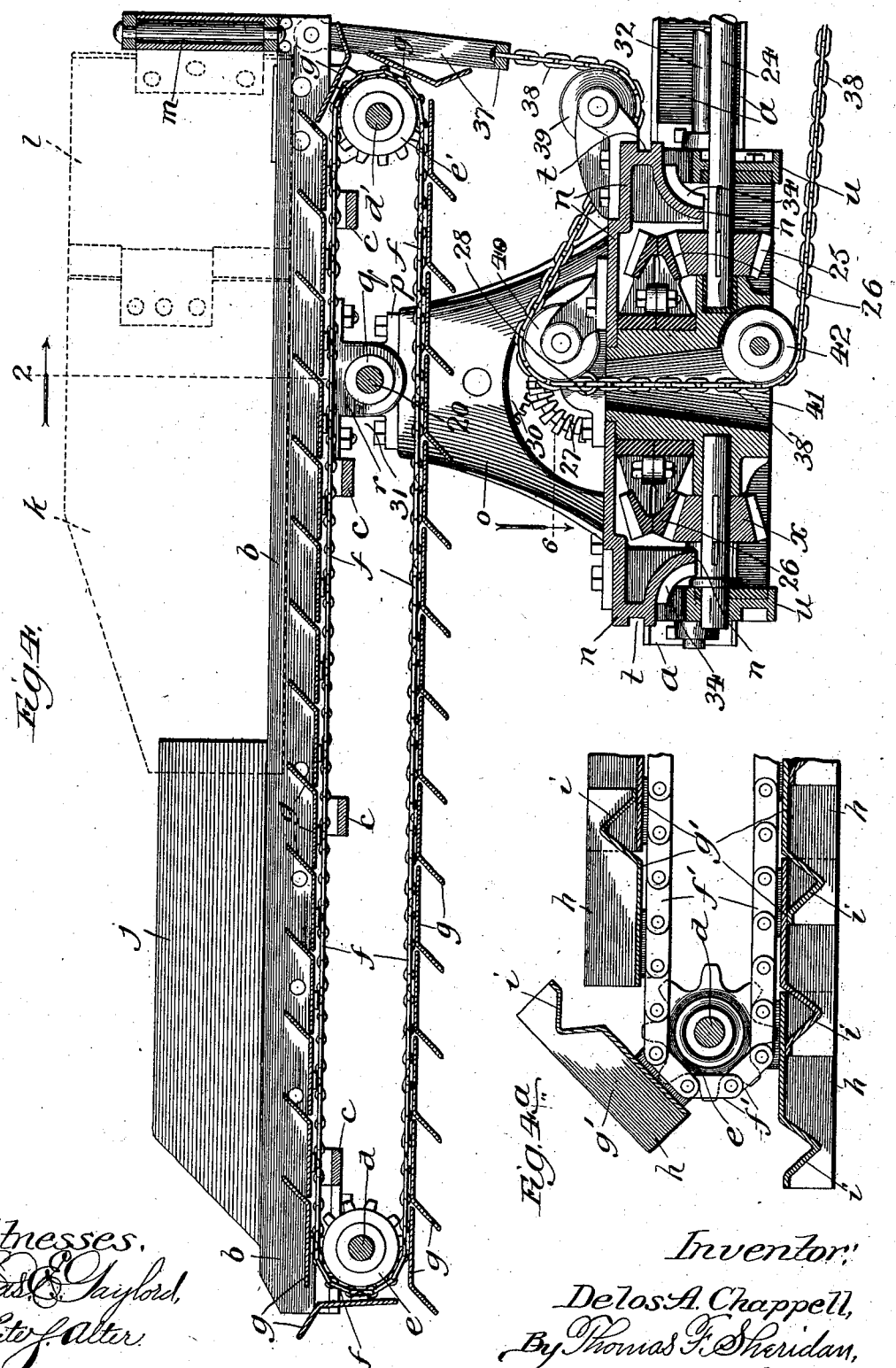
Witnesses
Inventor
Delos A. Chappell,
By Thomas F. Sheridan,
Atty.

No. 702,625. Patented June 17, 1902.
D. A. CHAPPELL.
BOX CAR LOADER.
(Application filed Mar. 8, 1901.)
(No Model.) 10 Sheets—Sheet 4.
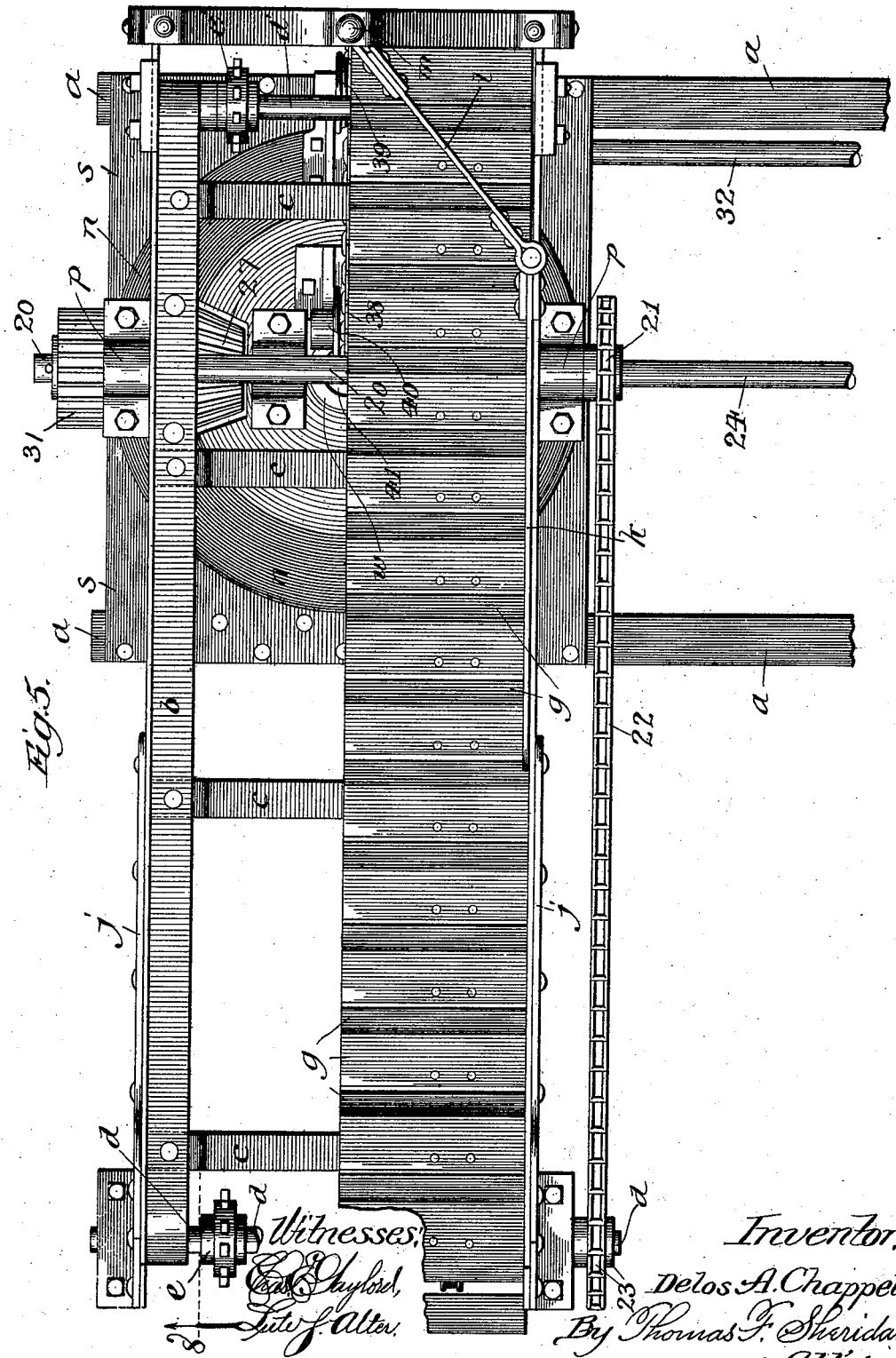

No. 702,625. Patented June 17, 1902.
D. A. CHAPPELL.
BOX CAR LOADER.
(Application filed Mar. 8, 1901.)
(No Model.) 10 Sheets—Sheet 5.
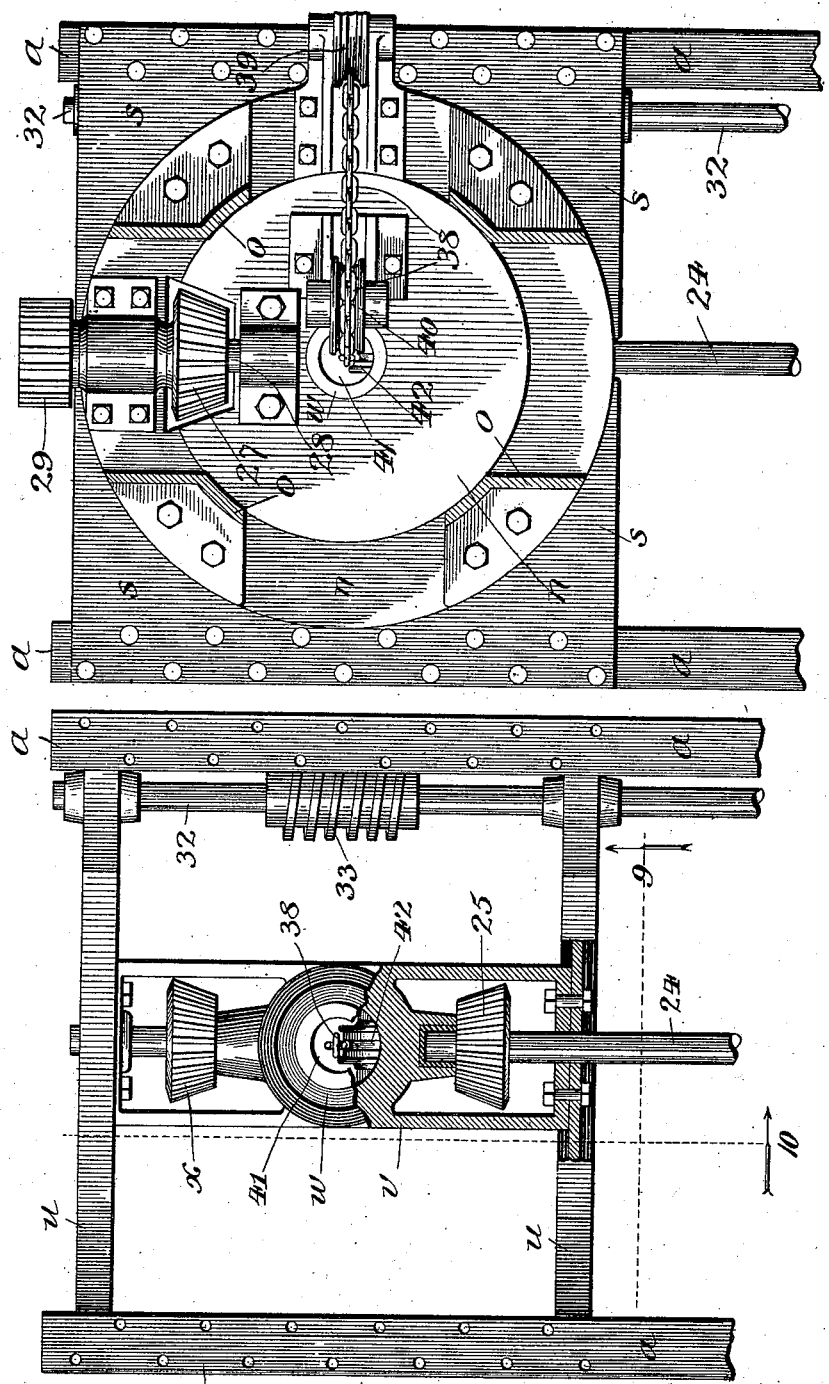

No. 702,625. Patented June 17, 1902.
D. A. CHAPPELL.
BOX CAR LOADER.
(Application filed Mar. 8, 1901.)
(No Model.) 10 Sheets—Sheet 6.
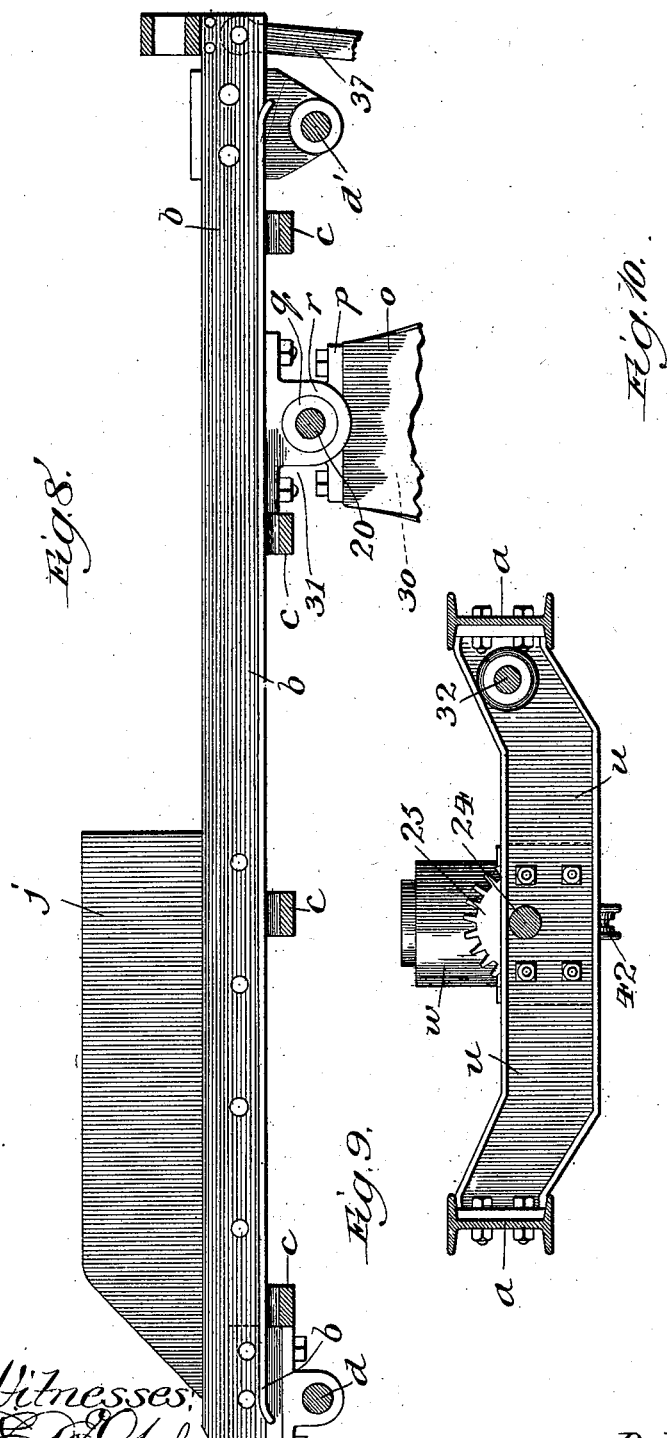
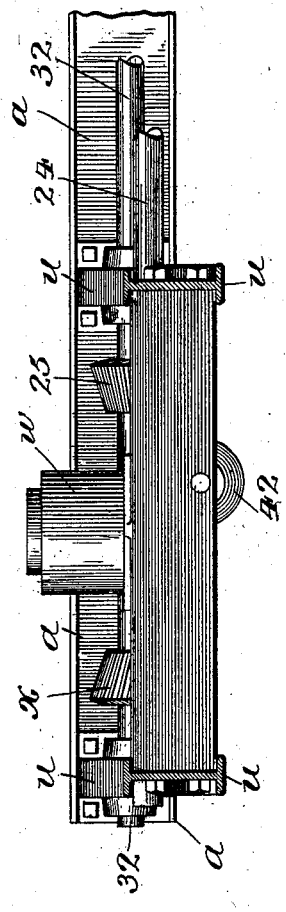
Witnesses
Inventor,
Delos A. Chappell,
By Thomas F. Sheridan,
Att'ys No. 702,625. Patented June 17, 1902.
D. A. CHAPPELL.
BOX CAR LOADER.
(Application filed Mar. 8, 1901.)
(No Model.) 10 Sheets—Sheet 7.
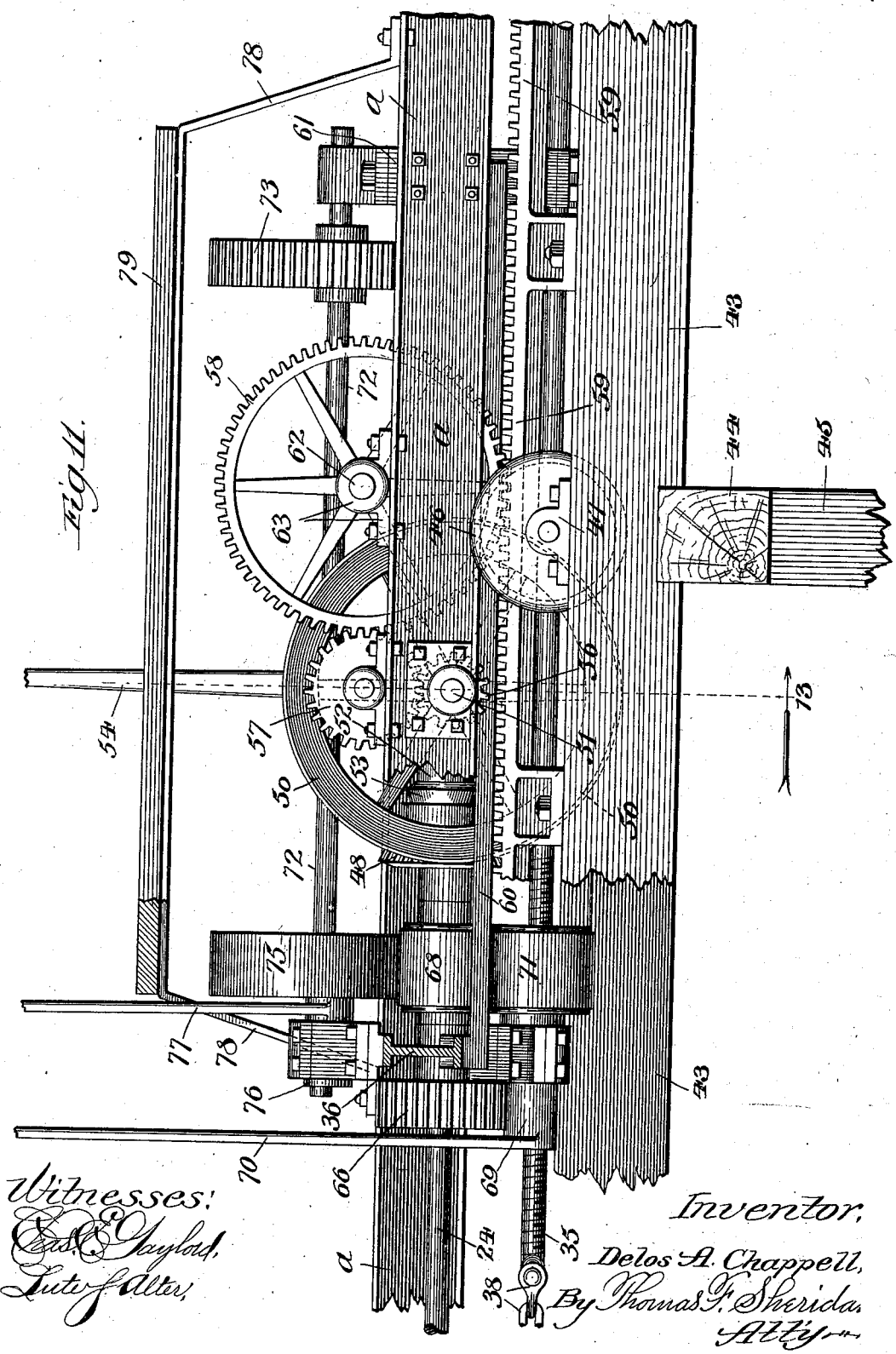
Witnesses:
Inventor,
Delos A. Chappell,
By Thomas F. Sheridan
Atty.

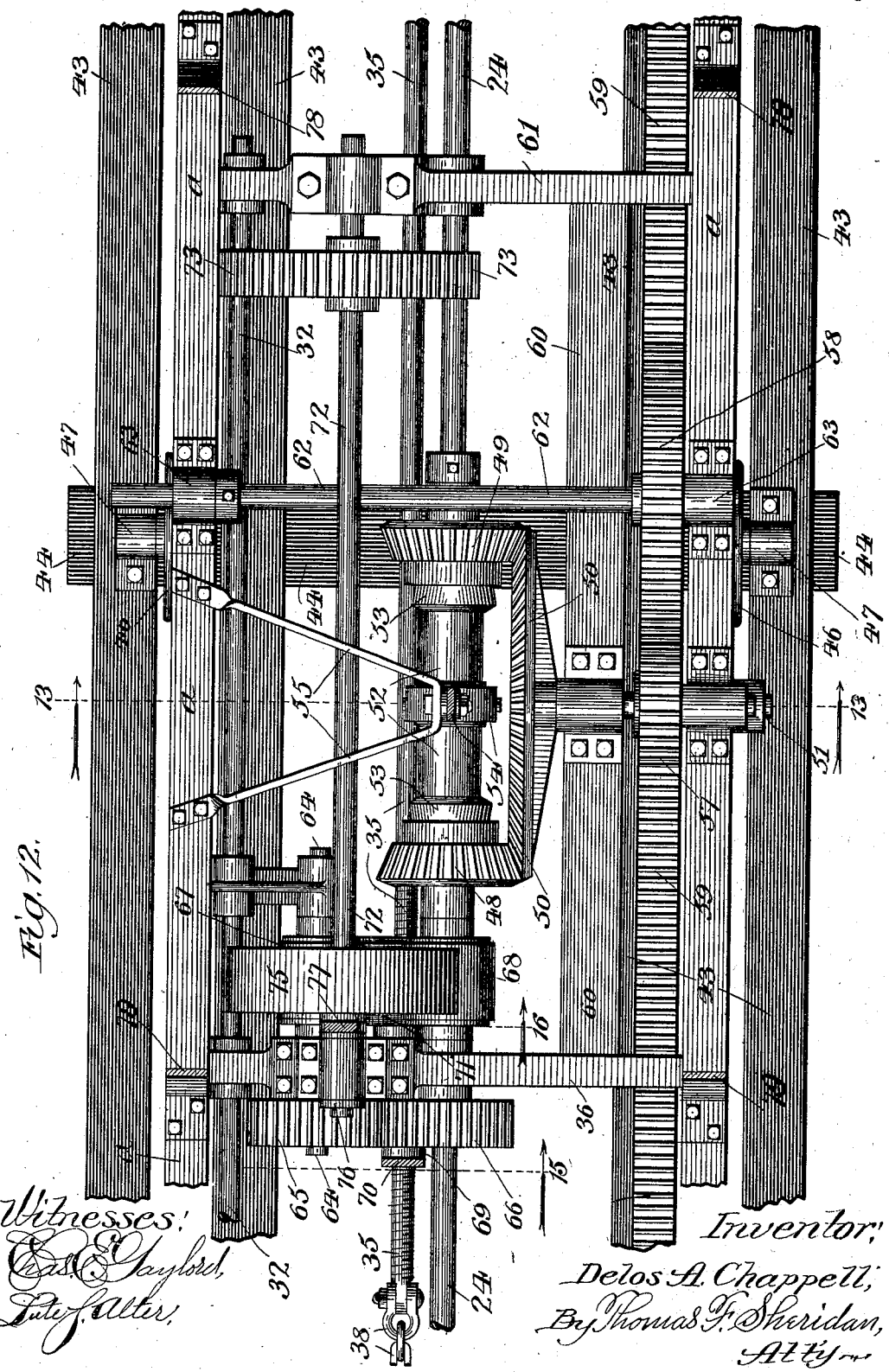

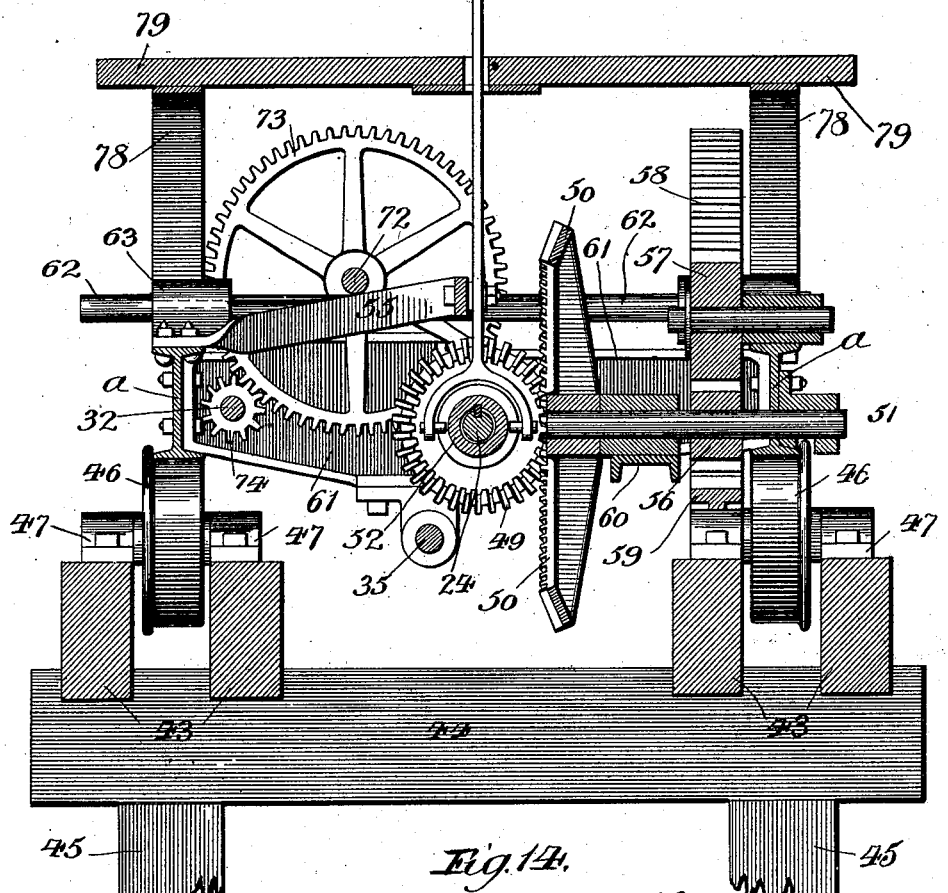

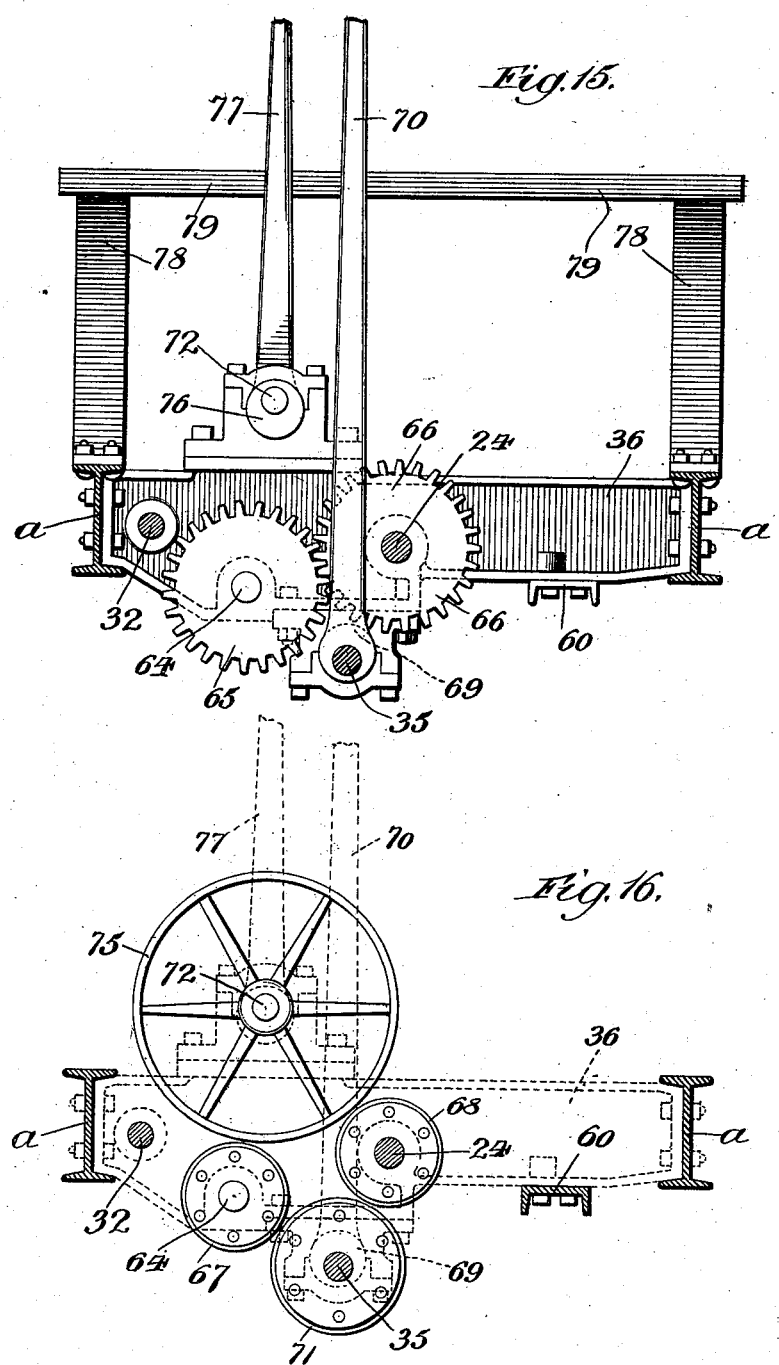

United States Patent Office.

DELOS A. CHAPPELL, OF DENVER, COLORADO, ASSIGNOR TO THE VICTOR BOX CAR LOADER COMPANY, OF DENVER, COLORADO, A CORPORATION OF COLORADO.

BOX-CAR LOADER.

SPECIFICATION forming part of Letters Patent No. 702,625, dated June 17, 1902.

Application filed March 8, 1901. Serial No. 50,369. (No model.)

*To all whom it may concern:*

Be it known that I, DELOS A. CHAPPELL, a citizen of the United States, residing at Denver, in the county of Arapahoe and State of Colorado, have invented certain new and useful Improvements in Box-Car Loaders, of which the following is a specification.

The invention relates to that class of loaders which are adapted to be used for the purpose of loading coal, ore, or similar material into a box-car, and particularly to the means by which the material is received and thrown into the car.

It relates, further, to the arrangement of the elements forming the loader and the construction thereof, all of which will more fully hereinafter appear.

The principal object of the invention is to provide a simple, economical, and efficient loader for box-cars.

A further object is to provide an endless flexible conveyer provided with a plurality of "flights" to receive the coal or similar material and throw it into the car.

Further objects of the invention will appear from an examination of the drawings and the following description and claims.

The invention consists in the features, combinations, and details of construction hereinafter described and claimed.

Figure 1:
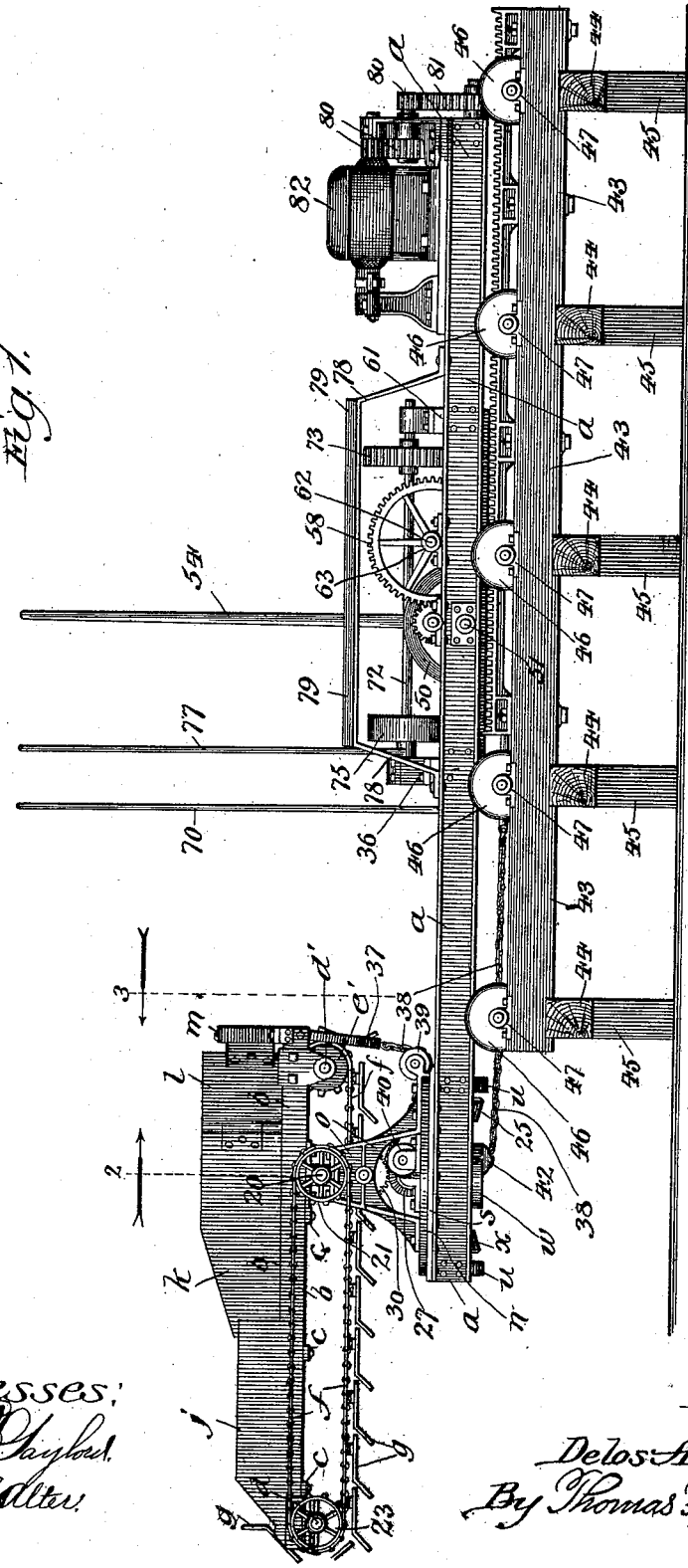
Figure 2:
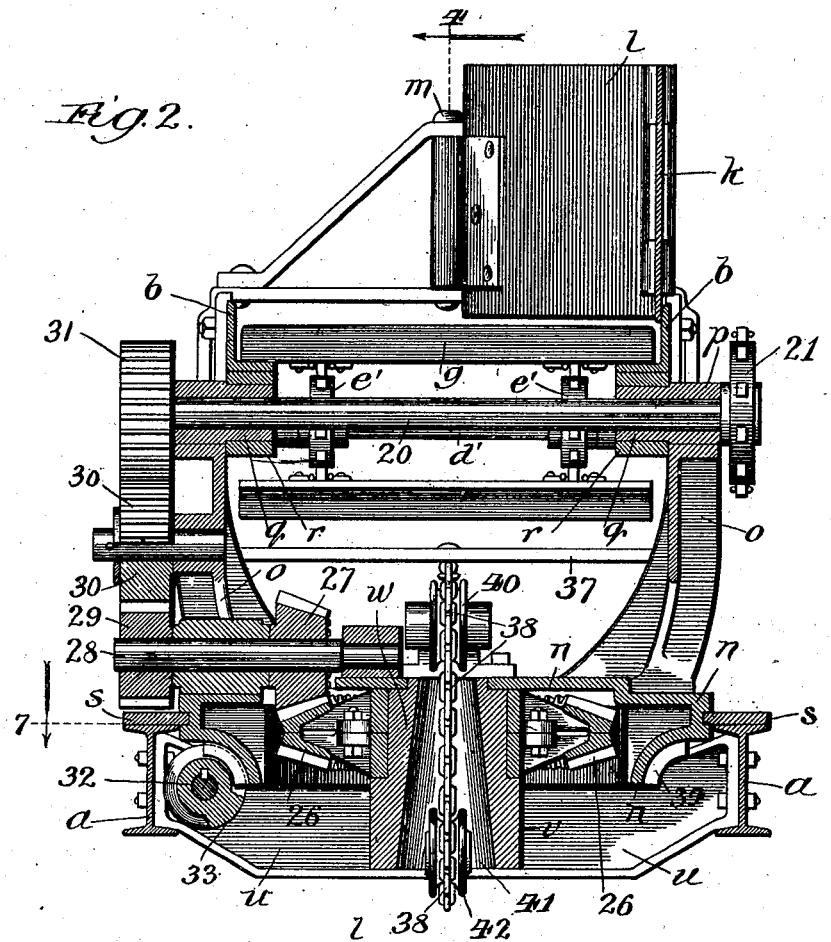
Figure 3:
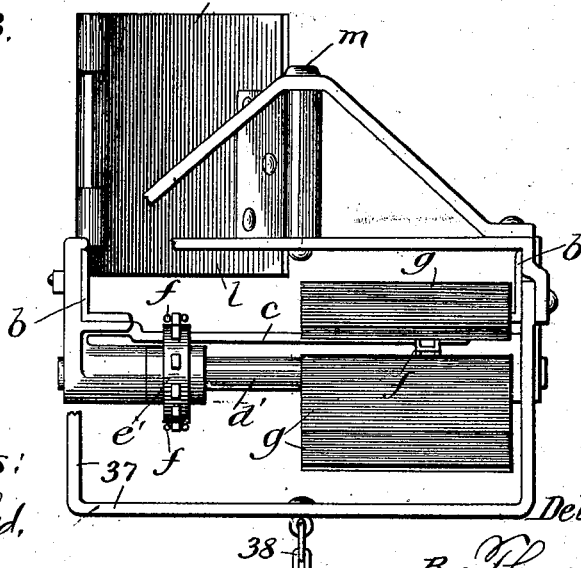

In the accompanying drawings, Figure 1 is a side elevation of a complete loader constructed in accordance with my improvements; Fig. 2, an enlarged cross-sectional view taken on lines 2 of Figs. 1 and 4 looking in the direction of the arrows; Fig. 3, a detail elevation, partly in section, looking at the mechanism from the line 3 of Fig. 1 in the direction of the arrow; Fig. 4, a longitudinal sectional elevation of a portion of the mechanism, taken on line 4 of Fig. 2 looking in the direction of the arrow; Fig. 4ᵃ, a sectional detail of my improved form of flight conveyer, more fully hereinafter set forth; Fig. 5, a plan view of the flight conveyer shown in Fig. 4 looking at it from above and showing one-half of the flights removed; Fig. 6, a plan sectional view of a portion of the mechanism, taken on line 6 of Fig. 4 looking in the direction of the arrow; Fig. 7, a plan sectional view of a portion of the mechanism looking at it from about the line 7 of Fig. 2 and in the direction of the arrow; Fig. 8, a side elevation of a part of the flight-conveyer frame, taken on line 8 of Fig. 5 looking in the direction of the arrow; Fig. 9, a sectional detail taken on line 9 of Fig. 7 looking in the direction of the arrow; Fig. 10, a similar view taken on line 10 of Fig. 7 looking in the direction of the arrow; Fig. 11, an enlarged side elevation of the operating mechanism; Fig. 12, a plan view of the same; Fig. 13, a cross-sectional view taken on the lines 13 of Figs. 11 and 12; Fig. 14, a sectional detail of the reversing-gear by which the carrier-frame is moved backwardly and forwardly upon its support; Fig. 15, a cross-sectional view of a portion of the mechanisms, taken on line 15 of Fig. 16; and Fig. 16, a cross-sectional detail taken on line 16 of Fig. 12 looking in the direction of the arrow.

In the art to which this invention relates it is well known that box-cars are used for the purpose of carrying bituminous or anthracite coal and ores, but that there is considerable objection to the use of the same owing to the difficulty and expense of loading them with such materials. The principal object, therefore, of my invention is to provide a loader for this type of cars by which coal (either bituminous or anthracite) or ore may be loaded into the same, and particularly to the means, arrangement, and construction thereof, all of which will more fully hereinafter appear.

In constructing a coal-loader in accordance with my improvements I make a supporting-carriage arranged to be moved backward and forward and which is composed of two I-beams *a*, that form the longitudinal lateral main supporting members thereof, and which are joined or tied together by cross-beams at two or more points throughout their length.

It is desirable that means be provided for receiving the coal which shall also be capable of delivering the same through the end of the car. To accomplish this, flexible means must be provided, which can be set at any angle and be capable of throwing the coal down or up at each end of the car. For this purpose I provide what I term a "flight conveyer," formed of a supporting-frame portion composed of two side bars *b*, formed of angle-iron and tied together by tie-rods c. (Shown particularly in Figs. 4 and 5.) Mounted in suitable bearings at or near each end of this frame are rotatable shafts d and d', provided with sprocket-wheels e and e', upon which are mounted the supporting-chains or link belts f. Secured to these flexible belts in any convenient manner, either by riveting or otherwise, is the coal receiving and discharging mechanism, formed of a plurality of flights g, having a horizontal portion and an angular heel portion. These flights are secured to the chain at or near their forward edges and near the ends, and each heel of the flight overlaps in a measure the forward edge of the next succeeding flight, so as to prevent the coal when the flights are moving in a horizontal plane from falling down between the same. It is desirable that when the coal is being discharged from the flight it be given an increased impetus, and in accomplishing this result the forward edges of the flights are secured to the supporting-chain, so that as the chain turns around on its bearing portion at or near the discharging end the rear edges of the flights are given an increased impetus due to increasing radii which they assume, so that the coal is thrown at an increased velocity, all of which will be understood and appreciated by those skilled in the art.

In Fig. 4ª I have shown my flight conveyer in its preferred form—that is, in a form that is capable of being used for coal or crushed ore, and in which the chains or link belts f' are provided with what might be termed "box-flights," having a horizontal base portion g', as described before, but being also provided with side flanges h. It is also provided with the angular heel extending backwardly and upwardly, as above described, but has in addition thereto a downwardly-extending inclined portion i, which extends downward, so as to overlap the horizontal portion of the next succeeding flight. In this way and by this construction the falling of any ore through the conveyer into the supporting operating mechanism is minimized, as each flight contains but a limited quantity, which is easily and readily discharged and which is practically limited to the rear portion of the flight, so as to get its increased discharging impetus in an efficient and capable manner.

The flight conveyer is slightly longer than the side openings in ordinary box-cars, and is of such length that it is difficult to turn it while in the car. This will be appreciated when it is understood that this discharging-conveyer has to be arranged when in the car longitudinally thereof, so as to discharge first to one end and then to the other. It becomes necessary, therefore, to provide side portions for keeping the coal in engagement with the flights, and which is adapted to be used when the discharging-conveyer is pointed toward either end of the car, and at the same time permit a coal-chute to be brought close to the flight. In order to accomplish this result, I provide the conveyer-frame with two fixed flanges j at each lateral edge and at or near the front portion, but which are not more than half as long as the conveyer, so as to permit of the coal being loaded at either side. The rear side portions of the flight conveyer, which are opposite the side openings of the car, are left free or open; but in order that either may be closed when necessary I provide a movable flange formed in two sections—a section k, which forms a side section, and an angular rear section l, to which it is pivoted and which is also pivoted or hinged to a pin m on the conveyer-frame. (See Figs. 4 and 5.) This movable portion of the flange can be arranged at one side, as shown in Fig. 5, so that the coal can be received through the opening of the car on the opposite side, and which permits the end of the coal-chute to remain in close proximity to the flights. When the conveyer is turned around, so that its discharge end is pointed toward the other end of the car, this movable flange can be swung over to its opposite position on the other side of the conveyer-frame and permit coal or ore to be received on the opposite side of the conveyer from that on which it has been hitherto received. It is desirable that means be provided by which this conveyer-frame is supported, so that it may be swung in a horizontal plane or tilted to any desired angle in a vertical plane, the swinging being for the purpose of permitting it to be removed from a car or turning it around, or for any other purpose, and the inclination being for the purpose of facilitating the discharge of the coal close to the desired point in the car. In order to accomplish this result, a turret n is provided, (see Figs. 2 and 4,) carrying two pillars or upwardly-extending arms o, the upper ends of which are provided with bearing boxes or blocks p, as shown in Fig. 2. These bearing-blocks have inwardly-extending hubs q, upon which journal-boxes r are rotatably mounted, and which boxes are secured to the angle-irons that form the side frames of the flight conveyer, so that such conveyer can be turned in a horizontal plane on its supporting-turret and tilted in a vertical plane on its journal-boxes.

To support the turret in position, the main carrier or carriage is provided with a supporting-plate s, secured transversely thereto, and which is made in two sections, so as to provide a circular opening, the inner circular edge of the plate entering an annular groove t in the turret. (See Figs. 2 and 4.)

The plate which supports the turret has its outer ends or lateral edges riveted to the I-beams, which form the main members of the supporting-carrier. It is desirable, however, that supplementary means be provided to assist in supporting the turret, so as to release the lateral strain on the supporting-plate and prevent its being buckled to better perform its functions. In order to accomplish this result, a bridge is provided, formed of two cross members or I-beams $u$, (see Fig. 7,) riveted or otherwise secured to the main supporting I-beams and to which its longitudinal casting or bridge proper, $v$, is secured, which casting has a central hub portion $w$, extending upwardly into a central opening in the turret and with its axis arranged coincident or in alinement therewith.

To provide means by which the flight-conveyer may be driven, a shaft 20 is provided and passed through the journal-boxes in the turret-pillars, which are also in axial alinement with the bearing-boxes on the flight-conveyer frame, as shown particularly in Figs. 2 and 8. This shaft is what might be termed or called the "flight-driving" shaft, and is provided at or near one end with a sprocket-wheel 21, which by means of a link-belt 22 engages a sprocket-wheel 23 on the forward sprocket-shaft $d$ of the flight-conveyer. To drive this flight-conveyer shaft, a main driving-shaft 24 is provided, arranged longitudinally of the supporting-carriage, and which is connected with a suitable source of motive power hereinafter set forth. The front end of this driving-shaft is provided with a bevel-pinion 25, (see Fig. 4,) engaging with the teeth on the lower face of a two-faced bevel-gear 26, which is rotatably mounted upon the hub $w$ in the space between the turret and its supporting-bridge. The teeth on the upper face of the two-faced bevel-gear engage with a bevel-pinion 27, (see Fig. 2,) passed through a slot in the turret and mounted upon a short or stub shaft 28, which has its inner journal in a bearing on the turret at or near the central part thereof and extends out through a bearing in one of the supporting-pillars. The outer end of this stub-shaft is provided with a spur-pinion 29, meshing with an intermediate spur-pinion 30, which in turn engages with a spur-gear 31 on the end of the flight conveyer driving-shaft and that end opposite to its sprocket-wheel.

From the foregoing description of construction and operation it will be seen that no matter what position the flight conveyer is in or what plane it occupies vertically or horizontally the movements of the main continuous driving-shaft are always imparted to and operate the flight conveyer. An idler bevel-pinion $x$ is provided and rotatably mounted in the supporting-bridge opposite and in line with the main shaft to balance the two-faced bevel-gear and prevent its assuming a cramped position.

To rotate the turret and thereby swing the flight-conveyer in a horizontal plane, a worm-shaft 32 is provided, having a worm 33, which engages with worm-teeth 34, that form a worm-gear on the lower peripheral surface of the turret, as shown particularly in Fig. 2. The rotation of this worm-shaft in either direction serves to operate the worm-gear and turret, and thereby the flight conveyer, in a horizontal plane.

It is desirable that efficient means be provided for tilting the flight conveyer in a vertical plane. To accomplish this result, a threaded shaft 35 is provided and mounted in suitable bearings in a cross-piece or tie-bar 36, (see Figs. 11 and 15,) which secures the two main I-beams of the supporting-carriage together. A bail 37 is provided and pivoted to the rear end of the flight conveyer, and from this bail a chain 38 extends and is connected with a clip on the screw-shaft. It is desirable that means be provided which will not interfere with the movement of the screw-shaft and will permit the swinging movements of the flight conveyer above referred to. In order to accomplish this result, the turret is provided with two idler-pulleys 39 and 40, secured thereto by means of brackets—one on the periphery thereof and the other with its grooved peripheral surface arranged in alinement with the axis of the bridge—so that the chain above referred to may be passed around these pulleys down through an axial opening 41 in the bridge-hub and around an idler 42, which is secured to the bridge, thence in a substantially horizontal plane to the screw-shaft. From this it will be seen that the movements of the turret in any direction do not interfere with the operations of the chain. It is further desirable that some means be provided by which the supporting-carriage may be movably held in position—that is, that it can be moved backward and forward and carry the flight conveyer into and out of a car. To accomplish this, a supporting-trestle is preferably provided, which is formed of the beams 43, longitudinally arranged in pairs upon the cross-ties 44, in turn supported upon the uprights 45. Arranged between each pair of these longitudinal beams is a plurality of supporting flanged wheels 46, journaled in boxes 47 and underneath the I-beams which form the main supporting-carriage. These I-beams or the lower flanges thereof rest upon the peripheral surfaces of these supporting-wheels and inside the flanges thereof, as shown particularly in Fig. 13, so that, as shown in Figs. 1 and 11, such carriage may be moved backward and forward with the least expenditure of power. To move this supporting-carriage backwardly and forwardly upon its supporting-wheels, the main shaft is provided with two bevel-pinions 48 and 49, loosely mounted thereon, which pinions engage with a bevel-gear 50 upon a transversely-arranged stub-shaft 51, so as to rotate this bevel-gear in either direction. Arranged between the front faces of the bevel-pinions is a clutch-sleeve 52, splined so as to engage a feather in the main shaft and rotate therewith, but have independent longitudinal movements. This clutch-sleeve is provided at each end with tapered portions 53, adapted to engage tapered recesses in the front end of the bevel-pinions and form in connection therewith friction-clutches. As the clutch is moved in either direction by means of an operating-lever 54, pivotally mounted upon a bracket 55, secured to one of the I-beams of the main supporting-carriage, it effectually locks that particular bevel-pinion in engagement with the main driving-shaft, and consequently transmits a rotary motion to the right-angle stub-shaft 51. This stub-shaft has mounted and secured on it a spur-pinion 56, engaging with an intermediate spur-pinion 57, mounted in suitable bearings upon the upper flange of the supporting I-beam. This intermediate spur-pinion engages with a spur-gear 58, also journaled in suitable boxes or bearings on the I-beam and in turning engaging or meshing with a rack 59, secured to one, preferably the inner, of the longitudinal beams on the supporting-trestle.

A metallic channel-beam 60 is arranged parallel to the main I-beam, as shown in Fig. 12, and secured to the cross-beams 36 and 61, and acts as a stiffener for the structure and as an additional support for the bearing boxes for the stub-shaft 51. The large spur-gear 58, which meshes with the rack, is mounted upon and secured to a shaft 62, which has its bearings in boxes 63, arranged on both of the main I-beams. From the foregoing description of construction and operation it will be seen that the direction at which the main supporting-carriage is moved can be controlled by the operator by the simple movement of the main operating-lever 54.

As above suggested, the main shaft is continuously rotated—that is, until the main supply of energy is shut off. It is desirable to provide means by which the direction or longitudinal movement of the screw-shaft 35 can be obtained. In order to accomplish this, a supplementary shaft 64 is provided having a gear 65, which engages the spur 66 on the main shaft. (See Fig. 16.) In this way there are two shafts provided, 24 and 64, which run in opposite directions. These shafts are journaled in the cross-piece 36, as shown in Figs. 15 and 16, and the spur-gears above referred to are arranged on one side of such tie-piece, as shown in Fig. 12, while on the other side of this tie-piece, as shown in the same figure, the shafts are provided with friction-wheels 67 and 68. The screw-shaft is mounted in an eccentric bearing 69, to which is attached an operating-lever 70, while a rotatable nut 71 is provided having a threaded opening engaging with the threaded shaft and having its outer peripheral surface provided with a friction material, such as leather. As the operating-lever is swung in one direction or the other the rotatable friction-nut is thrown into contact with either of the friction-wheels 67 or 68, and the rotation of the nut thereby controlled. Rotating in one direction it draws the screw-shaft backward and acts to tilt or swing the free end, by the mechanism hereinbefore described, of the flight conveyer upwardly in a vertical plane, so that its free end will be moved upward. A movement of the operating-lever in the opposite direction swings the screw-shaft with its rotatable nut into engagement with the other friction-wheel, whereby it is rotated in an opposite manner, the threaded screw moved forwardly, and the free end of the flight conveyer permitted to move downwardly in a vertical plane.

It is desirable to provide means by which the shaft for rotating the screw and turret may be operated. In order to accomplish this, a third or auxiliary shaft 72 is provided having a spur-gear 73 engaging with a similar spur-pinion 74 on the worm-shaft above alluded to. This auxiliary shaft has a friction-pulley 75 at or near its front end and is supported in an eccentric bearing-box 76, controlled by an operating-lever 77, so that the vibrations of this operating-lever move the journal-box to swing the friction-pulley 75 into engagement with either of the friction-wheels 67 and 68 on the main and supplementary shafts above described, which operates to rotate this auxiliary shaft, and thereby the worm-shaft, in either direction and causes the rotations of the turret in either direction, as may seem necessary. It is also desirable to provide a platform above this operating mechanism where the operator can stand. To provide for this, two brackets 78, formed of metal bars, are provided, bent in the desired shape and secured to the I-beams, as shown in Figs. 1 and 11, upon which the platform 79 is mounted, so that the operator may stand thereon and have all of the operating-levers within easy reach and control.

The prime mover which I have thought it desirable to provide in this class of mechanisms (see Fig. 1) is an electric motor 82, connected with a suitable source of electric energy and having its armature-shaft engaged, by means of a suitable train of gearing 80, with a gear 81 on the main operating-shaft above alluded to.

I claim—

1. In a box-car loader, the combination of a supporting-carriage formed of two metal I-beams joined together at several points, a supporting-plate provided with a circular opening secured to such supporting-carriage, a turret consisting of a single unitary structure provided with an annular groove rotatably mounted on such plate, and a flexible conveyer mounted on such turret so as to rotate in a horizontal plane, substantially as described.

2. In a box-car loader, the combination of a supporting-carriage formed of two metal I-beams joined together at two or more points, a two-part plate providing a circular opening secured to the supporting-carriage, a turret rotatably mounted on such two-part plate, a flexible conveyer pivotally mounted on the turret, means for swinging the conveyer in a vertical plane, and means for turning the turret with its conveyer in a horizontal plane, substantially as described.

3. In a box-car loader, the combination of a supporting-carriage formed of two metal I-beams joined together at two or more points, a rotatable turret having an annular groove and a central perforation, a two-part plate secured to the I-beams of the main supporting-carriage and entering the annular groove of the turret, a bridge provided with an upwardly-projecting hub portion entering the central opening of the turret to assist in supporting the same and secured to the I-beams of the main supporting-carriage, a flexible conveyer pivotally secured to the turret, means for swinging the flexible conveyer in a vertical plane, and means for rotating the turret, substantially as described.

4. In a box-car loader, the combination of a supporting-carriage formed of two metal I-beams joined together at two or more points, a rotatable turret provided with upwardly-extending arms or pillars, an annular groove, a central perforation, and a worm-gear on its lower portion, a plate secured to the I-beams and entering the annular groove to rotatably support the turret, a bridge secured to the I-beams and provided with a central upwardly-projecting hub entering the central opening of the turret to assist in supporting the same, a worm in engagement with the worm-gear to rotate the turret, a flexible conveyer arranged in substantially a horizontal plane and pivotally mounted upon the upwardly-extending arms or pillars of the turret, and means for swinging the flexible conveyer in a vertical plane, substantially as described.

5. In a box-car loader, the combination of a supporting-carriage formed of two metal I-beams joined together at two or more points, a rotatable turret provided with an annular groove and a central perforation, plate mechanism secured to the I-beams and entering the annular groove of the turret to rotatably support the same, a metallic bridge secured to the I-beams and provided with a vertical hub portion entering the central opening of the turret to assist in rotatably supporting the same, a two-faced bevel-gear rotatably mounted on the hub portion between the turret and the bridge members, a conveyer-frame provided with a flexible conveyer pivotally secured to the turret portion in a horizontal plane, gear mechanism engaging with the upper part of the two-faced bevel-gear and the flexible conveyer to operate the same, and means for swinging the flexible conveyer-frame in a vertical plane, substantially as described.

6. In a box-car loader, the combination of a supporting-carriage formed of two metal I-beams joined together at two or more points, a rotatable turret provided with a central groove in its periphery and a central opening and carrying a flexible conveyer arranged in substantially a horizontal plane and adapted to be swung in horizontal and vertical planes, plate mechanism secured to the I-beams of the supporting-carriage and entering the annular groove of the turret, a metallic bridge secured to the I-beams of the main carriage and provided with a central vertical hub entering the central opening of the turret to assist in supporting the same, a two-faced bevel-gear rotatably mounted in the hub in the space between the turret and the bridge members, a main shaft rotatably mounted in the bridge and provided with a bevel-pinion engaging the lower toothed surface of the two-faced bevel-pinion, and a second bevel-pinion arranged opposite the first-named bevel-pinion rotatably mounted in the bridge and engaging the lower toothed surface of the two-faced bevel-gear to act as a balancing-idler, substantially as described.

7. In a box-car loader of the class described, the combination of a main supporting-carriage formed of two longitudinal members joined together at two or more points, a turret rotatably mounted on the main supporting-carriage at or near the front end thereof and provided with a flexible conveyer arranged in substantially a horizontal plane and adapted to be swung in horizontal and vertical planes, a threaded shaft, flexible means connecting the threaded shaft with the frame of the flexible conveyer, whereby the longitudinal movements of the threaded shaft impart a swinging movement in a vertical plane to the flexible conveyer and its frame, a rotatable nut, a main shaft, and means for throwing the rotatable nut into and out of engagement with the main shaft to operate it and thereby give the threaded shaft its longitudinal movement, substantially as described.

8. In a box-car loader, the combination of a main supporting-carriage, a turret rotatably mounted on the same at or near its forward end, a conveyer-frame provided with a flexible conveyer arranged in substantially a horizontal plane and pivotally connected to the turret so as to be swung in horizontal and vertical planes, a threaded shaft rotatably mounted in the supporting-carriage and flexibly connected with the conveyer-frame, a rotatable nut on the threaded shaft, the rotations of which impart longitudinal movement to the threaded shaft, a main shaft provided with a wheel, an auxiliary shaft in operative engagement with the main shaft and also provided with a wheel, and means for throwing the threaded nut into engagement with either one or the other of the shafts to impart the desired rotation thereto, substantially as described.

9. In a box-car loader, the combination of a main supporting-carriage, a turret rotatably mounted thereon at or near its forward end and provided with a worm-gear on its lower surface, a frame provided with a flexible conveyer pivoted to the upper part of the turret and arranged to be swung in vertical and horizontal planes, a worm-shaft arranged longitudinally of the carriage and provided with a worm engaging the worm-gear on the turret, a main driving-shaft, a supplementary shaft in engagement therewith, an auxiliary shaft in engagement with the worm-shaft at one end and provided with pulley-engaging mechanisms on the main and supplementary shafts, and means for throwing such pulley into and out of engagement with each of such shafts—the main and supplementary—to impart the desired rotation thereto for the operation of the screw-shaft, substantially as described.

10. In a box-car loader, the combination of a main supporting-carriage formed of two metallic I-beams provided with a rotatable turret carrying a flexible conveyer at or near its front end, a main shaft adapted to operate the conveyer, a support for the main carriage provided with a plurality of flanged wheels upon which the I-beams are movably mounted and with a toothed rack, a driving-gear on the supporting-carriage engaging the toothed rack, a stub-shaft mounted transversely in the supporting-carriage of the main shaft, a spur-gear at one end of such stub-shaft geared with the driving-gear, a bevel-gear on the other end of such stub-shaft, two loosely rotatably mounted bevel-gears on the main shaft in engagement with the bevel-gear, and a clutch slidingly mounted on the main shaft so as to rotate therewith but have independent longitudinal movements for engaging each of the loosely-mounted bevel-pinions to impart rotations in either direction to the main bevel-gear, and thereby to the driving-gear so as to move the supporting-carriage backward and forward, substantially as described.

11. In a box-car loader, the combination of a main supporting-carriage, a conveyer-frame provided with a flexible conveyer arranged in substantially a horizontal plane and pivotally mounted on the main supporting-carriage so as to be swung in the desired plane, flanged sides connected with the conveyer-frame on each side of the flexible conveyer so as to confine the same for a portion only of the length of the flexible conveyer, and a single flange pivotally secured to the conveyer-frame so as to cover one of the open sides of the flexible conveyer and be moved to the opposite side and back again, substantially as described.

12. In a box-car loader, the combination of a supporting-carriage, a conveyer-frame pivotally secured thereto, rotatable shafts in the conveyer-frame rotatably mounted in or near each end thereof, a conveyer formed of flexible belt mechanism passed around the shafts above mentioned and carrying a plurality of flights, and flights secured thereto and formed of the horizontal members and upwardly-extending rear members secured to the flexible belt at or near their forward edges so as to give their rear edges an increased impetus while making the discharging-turn, substantially as described.

13. In a box-car loader, a conveyer formed of a plurality of flexible elements, a plurality of flights having a horizontal or base portion, an upwardly-extending portion at the rear edge thereof, and a downwardly-extending portion overlapping the forward edge of the next succeeding flight, and means for securing the flights to the flexible elements at or near the forward edges, whereby the rear portion of the flights is given an accelerated motion as it reaches the turn at the discharging-points, substantially as described.

14. In a box-car loader, the combination of a supporting-carriage, a supporting-plate secured thereto and provided with an inner circular opening forming an inner circular edge adapted to enter the annular groove of a turret mounted on such supporting-plate, a turret consisting of a single unitary structure rotatably mounted upon such supporting-plate and provided with an annular groove arranged to admit the inner edge of the supporting-plate, and a flexible conveyer mounted upon such turret and rotatable therewith, substantially as described.

DELOS A. CHAPPELL.

Witnesses:
G. A. BARTLETT, Jr.,
W. H. HUFF.